June 2, 1925.
H. M. PARISH
WATER FILTER
Filed July 25, 1924
1,539,910
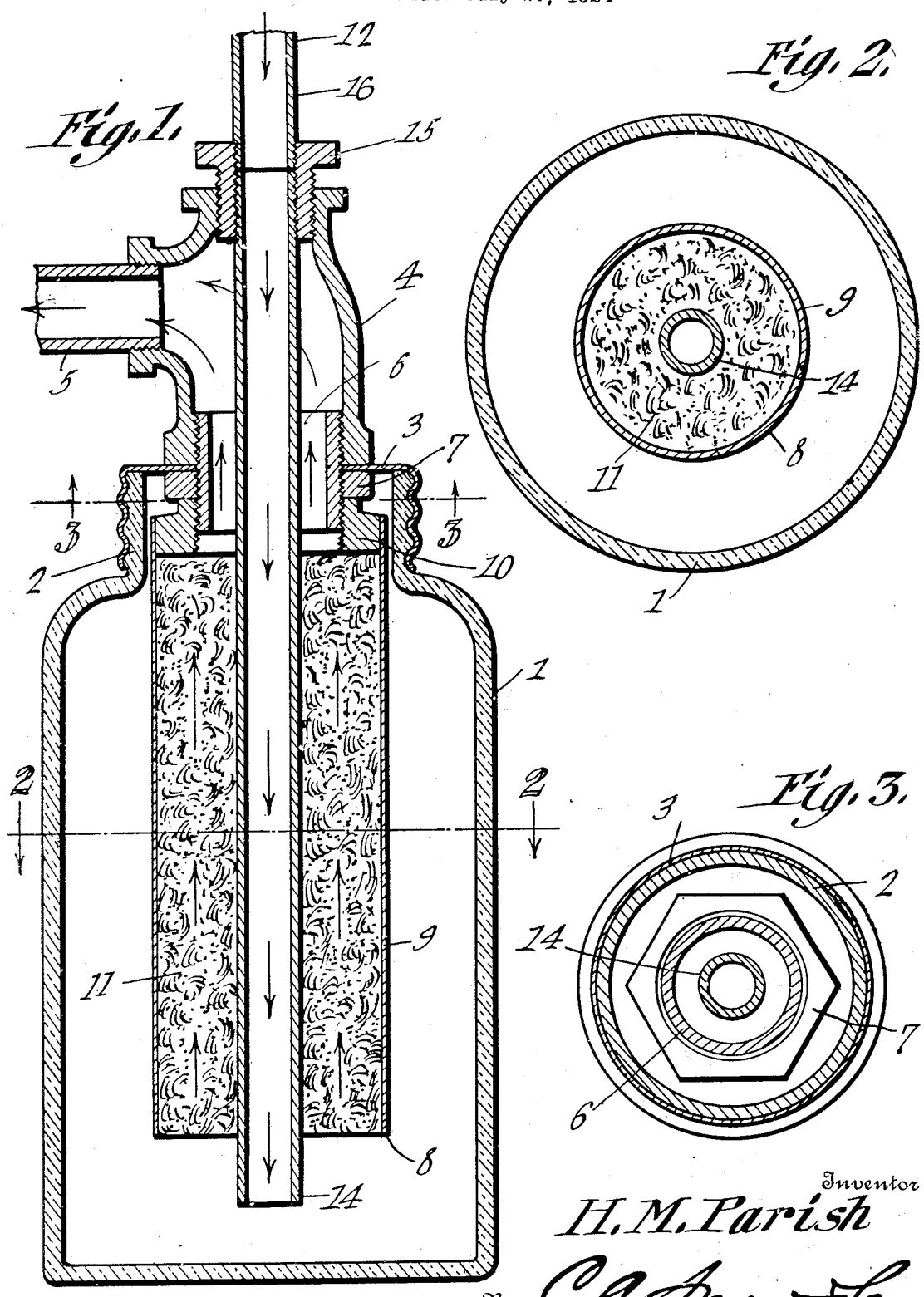
Inventor
H. M. Parish
By C. A. Snow & Co
Attorneys Patented June 2, 1925.

1,539,910

UNITED STATES PATENT OFFICE.

HOMER M. PARISH, OF CHARLOTTE, MICHIGAN.

WATER FILTER.

Application filed July 25, 1924. Serial No. 728,212.

*To all whom it may concern:*

Be it known that I, HOMER M. PARISH, a citizen of the United States, residing at Charlotte, in the county of Eaton and State of Michigan, have invented a new and useful Water Filter, of which the following is a specification.

The device forming the subject matter of this application is adapted to be employed for filtering water and is to be used primarily but not exclusively in connection with systems in which water is drawn from a cistern.

The invention aims to provide a device of the class described which may be manufactured cheaply out of stock materials, the device being so constructed that it can be cleaned readily, it being possible to renew the filtering material without difficulty.

It is within the province of the disclosure to improve generally and to enhance the utility of devices of that type to which the invention appertains.

Although a preferred form of the invention has been shown, it will be understood that a mechanic, working within the scope of what is claimed, may make changes, without departing from the spirit of the invention.

In the accompanying drawings:—

Figure 1 shows in longitudinal section, a device constructed in accordance with the invention; Figure 2 is a cross section on the line 2—2 of Figure 1; Figure 3 is a cross section on the line 3—3 of Figure 1.

In carrying out the invention, there is provided a receptacle 1, which may be an ordinary fruit jar, including a neck 2 whereon a closure, in the form of a cap 3 is threaded. The device includes an outlet member in the form of a reducing T 4 into the lateral arm of which is threaded a pipe 5 through which the filtered water is discharged. The lower end of the outlet member 4 rests on the closure cap 3. A coupling 6, in the form of a sleeve, extends through the cap 3 and is threaded into the outlet member 4. A nut 7 is threaded on the coupling 6 and engages the inner surface of the cap 3.

The numeral 8 designates a filter located within the receptacle 1, the filter embodying a cylindrical shell 9, open at its lower lower end, a head 10 in the form of a ring, being mounted in the upper end of the shell, the shell being filled, wholly or in part, by filtering material 11 of any desired sort. The head 10 of the filter is threaded on the lower end of the coupling sleeve 6 and abuts against the nut 7. An inlet conduit 12 extends through the filtering material 11, and through the outlet member 4, the conduit 12 embodying a tube 14 threaded at its upper end into a coupling or reducer 15, which is threaded into the upper end of the outlet member or T 4, the supply pipe 16 being likewise threaded into the coupling 15.

In practical operation, the water moves downwardly through the inlet conduit 12 and accumulates, to a greater or less depth, in the receptacle 1. The sediment is deposited in the bottom of the receptacle 1, to some degree, the water passing upwardly through the filtering material 11 and being thoroughly deprived of foreign matter thereby. The water moves upwardly through the sleeve 6 and the outlet member 4, and leaves by way of the pipe 5.

When the cap 3 is removed from the receptacle 1, the outlet member 4 and the filter 8 go with the cap, and the filter is rendered readily accessible, so that the filtering material 11 may be removed and renewed. Without describing every joint in the device, Figure 1 will make it manifest to a person skilled in the art that the device may be fashioned cheaply out of stock plumbing materials, the assembly and taking down of the structure calling for the use of no more elaborate tools than a couple of wrenches.

Although the shell 9 is open at its lower end, the filtering material 11 may be of such a nature that it can be packed in the shell tightly enough so that it will not fall out. Furthermore, since the water moves upwardly through the filtering material 11, and in view of the fact that there is an upward pressure of water on the filtering material, the filtering material will remain in place in the shell 9.

What is claimed is:—

In a device of the class described, a receptacle, a closure detachably mounted on the receptacle, a sleeve extended through the closure, a T having a lateral outlet, one end of the T being threaded on the sleeve and cooperating with the outer surface of the closure, a nut threaded on the sleeve and cooperating with the inner surface of the closure; a filter comprising a cylindrical shell having an opening, a head carried by the shell, and filtering material in the shell, the head being threaded on the inner end of the sleeve, and engaging the nut; a reducer mounted detachably in the other end of the T, a pipe extending through the filtering material, through the sleeve and through the T and threaded at one end into the reducer, and a supply pipe threaded into the reducer and coacting with the first-specified pipe to form an inlet conduit.

In testimony that I claim the foregoing as my own, I have hereto affixed my signature in the presence of two witnesses.

HOMER M. PARISH.

Witnesses:
A. B. COLLINS,
DONALD COLE.